US012657823B2

(12) United States Patent
Deschaintre et al.

(10) Patent No.: US 12,657,823 B2
(45) Date of Patent: Jun. 16, 2026

(54) VIEWPOINTS DETERMINATION FOR THREE-DIMENSIONAL OBJECTS

(71) Applicant: Adobe Inc., San Jose, CA (US)

(72) Inventors: Valentin Mathieu Deschaintre, London (GB); Vladimir Kim, Seattle, WA (US); Thibault Groueix, San Francisco, CA (US); Julien Philip, London (GB)

(73) Assignee: Adobe Inc., San Jose, CA (US)

( * ) Notice: Subject to any disclaimer, the term of this patent is extended or adjusted under 35 U.S.C. 154(b) by 204 days.

(21) Appl. No.: 18/458,032

(22) Filed: Aug. 29, 2023

(65) Prior Publication Data

US 2025/0078408 A1     Mar. 6, 2025

(51) Int. Cl.
G06T 17/20 (2006.01)
G06T 7/40 (2017.01)
H04N 13/279 (2018.01)

(52) U.S. Cl.
CPC ................ G06T 17/20 (2013.01); G06T 7/40 (2013.01); H04N 13/279 (2018.05)

(58) Field of Classification Search
CPC ........... G06T 17/20; G06T 7/40; G06T 15/04; H04N 13/279
See application file for complete search history.

(56) References Cited

U.S. PATENT DOCUMENTS

| | | | | |
|---|---|---|---|---|
| 8,686,992 B1 * | 4/2014 | Makadia | ............... | G06F 16/532 |
| | | | | 345/422 |
| 2014/0267247 A1 * | 9/2014 | Chen | ....................... | G06T 15/20 |
| | | | | 345/420 |
| 2022/0189062 A1 * | 6/2022 | Seo | .......................... | G06T 15/20 |
| 2023/0206566 A1 * | 6/2023 | Kim | ...................... | G06T 19/006 |
| | | | | 345/633 |
| 2024/0290054 A1 * | 8/2024 | Yin | ...................... | G06N 3/0475 |
| 2025/0126353 A1 * | 4/2025 | Ben Hariz | .............. | G06T 19/00 |

* cited by examiner

*Primary Examiner* — Xiao M Wu
*Assistant Examiner* — Latrell Anthony Creary
(74) *Attorney, Agent, or Firm* — FIG. 1 Patents

(57) ABSTRACT

Implementations of systems and methods for determining viewpoints suitable for performing one or more digital operations on a three-dimensional object are disclosed. Accordingly, a set of candidate viewpoints is established. The subset of candidate viewpoints provides views of an outer surface of a three-dimensional object and those views provide overlapping surface data. A subset of activated viewpoints is determined from the set of candidate viewpoints, the subset of activated viewpoints providing less of the overlapping surface data. The subset of activated viewpoints is used to perform one or more digital operation on the three-dimensional object.

20 Claims, 11 Drawing Sheets

802
Determining the Surface Data of the Three-Dimensional Geometry Provided by the Set of Candidate Viewpoints

804
Determining the Overlap of Surface Data provided by the Set of Candidate Viewpoints

806
Determining a Subset of Activated Viewpoints from the Set of Candidate Viewpoints based on Limiting Overlap of the Surface Data

808
Adding Further Activated Viewpoints to the Subset of Activated Viewpoints if those Further Activated Viewpoints Provide a Desired Amount of Additional Surface Data

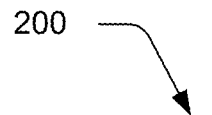
200
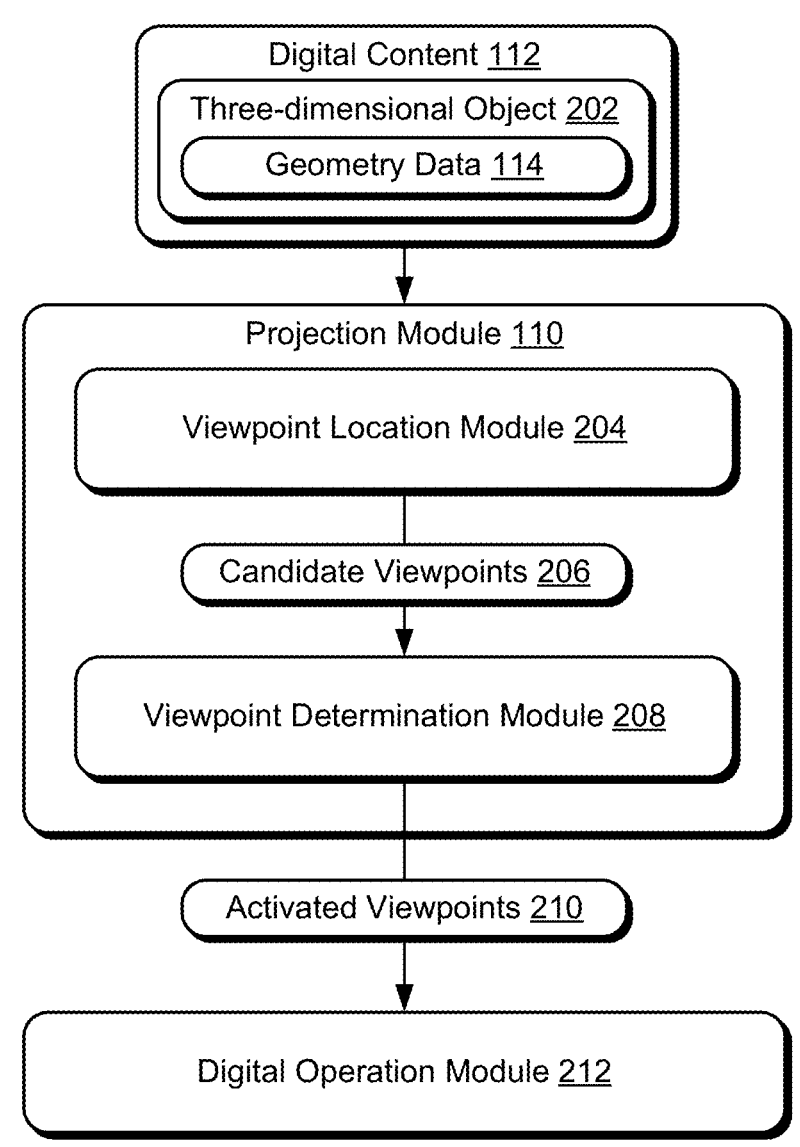
*Fig. 2*

500

502
Disposing a Set of Candidate Viewpoints about a Three-dimensional Object

504
Determining a Subset of Activated Viewpoints from the Set of Candidate Viewpoints 506
Performing One or More Digital Operations on the Three-Dimensional Object Using the Subset of Activated Viewpoints

600

<u>602</u>
Displaying the Framework

<u>604</u>
Displaying the Three-Dimensional Object within the Framework

<u>606</u>
Providing a Set of Candidate Viewpoints located About the Framework and Surrounding the Three-Dimensional Object

700

704

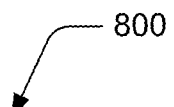
800

---

802
Determining the Surface Data of the Three-Dimensional Geometry Provided by the Set of Candidate Viewpoints

↓

804
Determining the Overlap of Surface Data provided by the Set of Candidate Viewpoints

↓

806
Determining a Subset of Activated Viewpoints from the Set of Candidate Viewpoints based on Limiting Overlap of the Surface Data

↓

808
Adding Further Activated Viewpoints to the Subset of Activated Viewpoints if those Further Activated Viewpoints Provide a Desired Amount of Additional Surface Data

VIEWPOINTS DETERMINATION FOR THREE-DIMENSIONAL OBJECTS

BACKGROUND

A variety of digital operations leverage the use of multiple viewpoints having different views of an outer surface of a three-dimensional object, e.g., a cup, a chair, a blender or the like. The digital operations leverage these viewpoints to perform those operations with respect to the three-dimensional object, e.g., to edit the object, render the object, texture the object and so on. In real world scenarios, a relatively large number of viewpoints are used by conventional techniques to view outer surfaces of three-dimensional objects to accommodate both simple and complex geometries. However, each additional viewpoint employed involves additional setup time and/or additional resources to store, initialize and utilize. Consequently, conventional techniques that rely on the relatively large number of viewpoints causes a corresponding increase in computation complexity, storage resources, and power consumption.

SUMMARY

Techniques for determining viewpoints for performing a digital operation on a three-dimensional object are described. In an implementation, a three-dimensional object is provided having a defined outer surface. A set of candidate viewpoints is disposed about the three-dimensional object, the candidate viewpoints including overlapping surface data of the outer surface of the three-dimensional object. A subset of activated viewpoints is determined from the set of candidate viewpoints that reduces the number of viewpoints used with respect to the three-dimensional object. To do so in one or more examples, the subset of activated viewpoints is determined based on overlaps detected of the outer surface and lessening the amount of overlap surface data provided by the candidate viewpoints. Further, one or more digital operations are performed on the three-dimensional object using the set of activated viewpoints, e.g., without using the set of inactivated viewpoints.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 2 depicts an example system for determining viewpoints for performing digital operations on a three-dimensional object in accordance with techniques described herein.

FIG. 8 is a flow diagram of an example methodology of determining a subset of activated viewpoints from a set of candidate viewpoints in accordance with techniques described herein.

DETAILED DESCRIPTION

Overview

Figure 1:
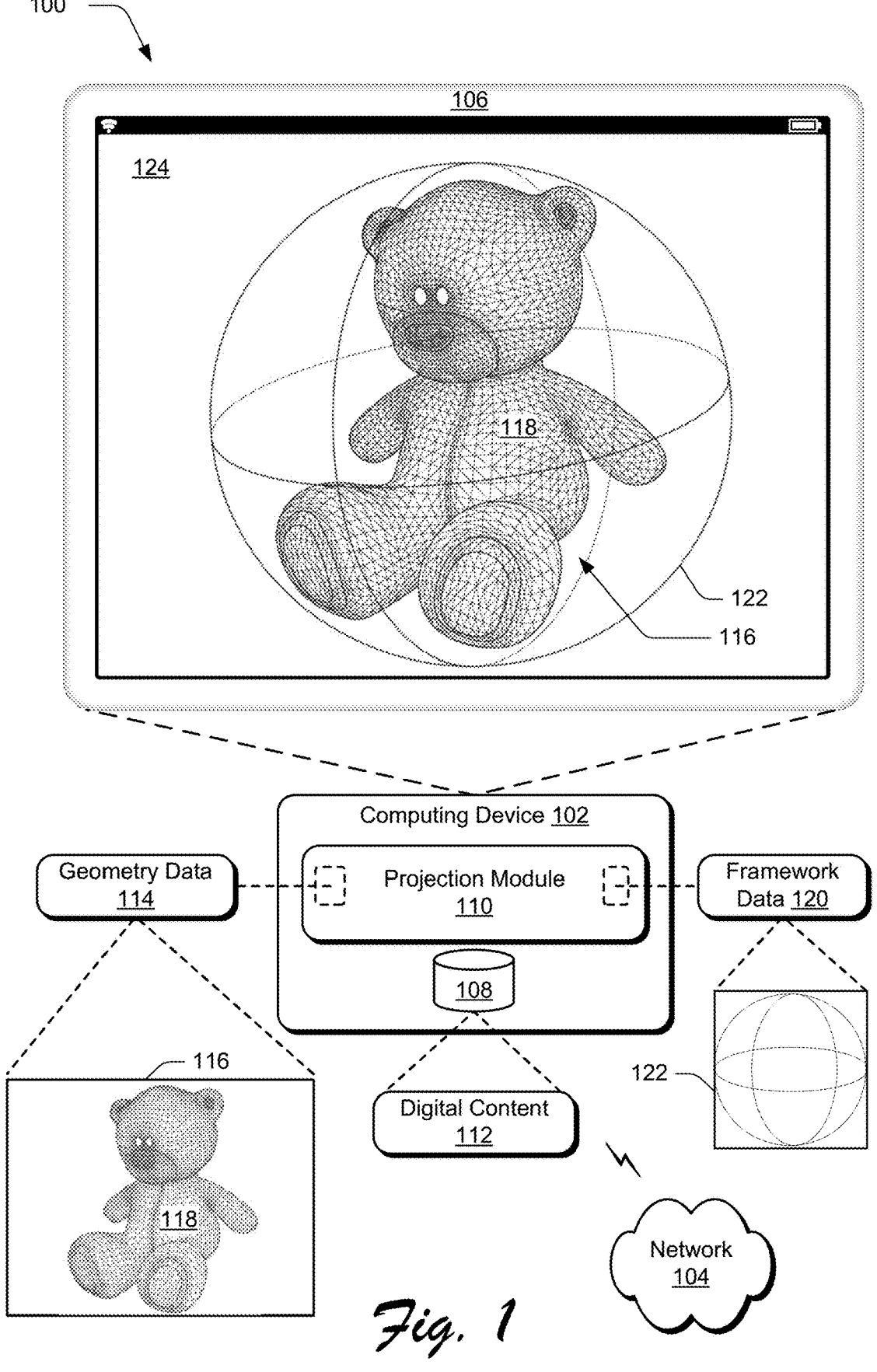
FIG. 1 is an illustration of an environment in an example implementation that is operable to employ digital systems and techniques for determining viewpoints that are used as a basis to perform digital operations on a three-dimensional object as described herein.

Multiple viewpoints are used in some digital operation scenarios to establish multiple views of a three-dimensional object, which are then used as a basis to support a variety of digital image operations. For example, one or more views may be desired for each of the front, back, sides, top and bottom of a selected three-dimensional object to accurately render the object, texturize the object, and so on. Accordingly, accuracy of these views in representing a surface of the object has a direct effect on digital image operations that rely on these views.

However, three-dimensional objects that have complex geometries and/or topographies (e.g., more contours, angles and so on) provide increased technical challenges when generating these views. Further, complexity at a surface of the object may vary. For example, the top surface of a boat typically has a complex surface when compared with a surface of a bottom of a boat, e.g., because the top of the boat can have seats, a windshield, a steering wheel, and so forth as opposed to a relatively smooth bottom of the boat.

Conventional techniques used to address these technical challenges have relied on relatively large numbers of viewpoints so that the systems and methodologies are able to accommodate different three-dimensional objects of variable geometric and surface complexity. Unfortunately, use of such large numbers of viewpoints can cause the systems to consume additional amounts of energy, time and/or other resources particularly when the topographies of three-dimensional objects or portions thereof are relatively simple. As an example, viewpoints for texturing a three-dimensional object can each take time to prepare for and then texture the three-dimensional object. Consequently, the use of large numbers of viewpoints increases an amount of time consumed for texturing a three-dimensional object by computing devices that are confronted by those large numbers of viewpoints.

Accordingly, techniques are described to dynamically adapt a number of viewpoints used to perform a digital operation, e.g., based on a relative complexity of the geometry and/or surface topography of a three-dimensional object. These techniques employ a set of candidate viewpoints in digital space that surround a three-dimensional object and provide views of the three-dimensional object. From this set of candidate viewpoints, a subset of activated viewpoints is selected where the subset of activated viewpoints reduces an overlap of the views of the candidate viewpoints while, at the same time, supporting views of the three-dimensional object sufficient to perform digital operations on the three-dimensional object (e.g., texturing of the outer surface of the three-dimensional object).

According to one example technique, a viewpoint module provides a set of candidate viewpoints that surround (either partially or fully) a three-dimensional object. Each of the candidate viewpoints provides a view of a portion of the three-dimensional object and the portion of the three-dimensional object viewed by each candidate viewpoint. From this set of candidate viewpoints, a subset of activated viewpoints is determined. The subset of activated viewpoints can then be employed to perform one or more digital operations (e.g., texturing of) on the three-dimensional object, particularly the surface of the three-dimensional object.

According to the example technique, a viewpoint determination module is employed to determine if candidate viewpoints is to added to a subset of activated viewpoints. In this example, one or more of the candidate viewpoints are selected and activated to begin the creation of a subset of activated viewpoints. The view of the portion of the three-dimensional object viewed by each of the candidate viewpoints is evaluated to determine if that view provides a threshold amount of additional surface information relative to the current subset of activated viewpoints. If the view satisfies the threshold amount of additional surface information, then the candidate viewpoint is activated and added to the set of activated viewpoints. If the view fails to satisfy the threshold amount of additional surface information, then the candidate viewpoint is inactivated thereby also creating a set of inactivated viewpoints.

The candidate viewpoints are typically evaluated iteratively for overlap. Iteratively, as used herein, means that the candidate viewpoints are evaluated one after the other or one set of candidate viewpoints after another or a combination thereof. The candidate viewpoints that are evaluated are typically adjacent to activated viewpoints already in the set of activated viewpoints. Evaluating candidate viewpoints that are adjacent to activated viewpoints typically helps assure that the portions of the three-dimensional object viewed by those adjacent candidate viewpoints have a significant amount of overlap with the portions of the three-dimensional object viewed by activated viewpoints. As used herein, a first viewpoint (e.g., a candidate viewpoint) is considered to be adjacent to a second viewpoint (e.g., an activated viewpoint) if there are no greater than five (5), more typically no greater than three (3) and even more typically no greater than two (2) viewpoints (e.g., activated, inactivated or candidate viewpoints) closer to the second viewpoint.

Once the set of activated viewpoints is initially determined, it is contemplated that viewpoints may be added or removed from the set of activated viewpoints to refine the set of activated viewpoints. An example of such refinement is further discussed herein. Once the set of activated viewpoints is finally established, the set of activated viewpoints is employed to perform one or more digital operations on (e.g., texturing of) the three-dimensional object.

It is noted herein that it is common in the computer industry to refer to these viewpoints as cameras or camera viewpoints. The skilled artisan will recognize based upon the disclosure herein that viewpoints can be established in a variety of ways in a digital or computer environment and that the term "viewpoint" is not meant to be limited in ways other than those specifically stated.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106.

The computing device 102 includes a storage device 108 and a projection module 110. The storage device 108 is configured using a computer-readable storage medium for storing digital content 112 such as digital images, digital artwork, digital videos, digital media, and so forth.

The projection module 110 is illustrated as having, receiving, and/or transmitting three-dimensional object data 114 and framework data 120. In some examples, the projection module 110 receives the three-dimensional object data 114, the framework data 120 or both via the network 104. For example, a user interacts with an input device (e.g., a mouse, a touchscreen, a keyboard, a stylus, etc.) to transmit the three-dimensional object data 114, the framework data 120 or both to the projection module 110 over the network 104. As shown, the three-dimensional object data 114 describes a three-dimensional object 116. In the example shown, the three-dimensional object 116 is a three-dimensional mesh 118 rendering of a teddy bear. Of course, the three-dimensional object 116 could be a rendering of nearly anything that can be mapped in three-dimensional space. The framework data 120 is shown as describing a framework 122 in the shape of a sphere. In other instances, the framework 122 can be alternative shapes such as a cube, a cylinder, a capsule, an icosahedron, a cuboid, or complex shapes.

As can be seen in the example environment 100, the projection module 110 projects the three-dimensional object 116 and the framework 122 onto a user interface 124. The framework at least partially or fully surrounds a portion or the entirety of the three-dimensional object 116. In the illustrated example, the three-dimensional object 116 is entirely surrounded by the framework 122. However, in other instances, the framework may partially or entirely surround a portion of the three-dimensional object 116. For example, and without limitation, it may be desirable to allow a user or multiple users to perform digital operations on different portions of the three-dimensional object. It is understood that the term surrounding, as used to refer to a framework disposed about the three-dimensional object or disposed about a location at which the three-dimensional object will be disposed, means that the framework either partially or fully surrounds the three-dimensional object or the aforementioned location unless otherwise specifically stated.

While the spherical configuration for the framework 122 is desirable for performing digital operations on several different objects, it is contemplated that alternatively shaped frameworks might be suitable for surrounding three-dimensional objects. For example, and without limitation, a prism-shaped or cylinder-shaped framework might be desirable for elongated three-dimensional objects such as sticks, snakes or the like. The projection module 110 is configured to reduce a number of viewpoints used as a basis for performing digital operations, an example of which is further described below and shown in corresponding figures.

FIG. 2 depicts a system 200 in an example implementation showing operation of the projection module in greater detail. The example system 200 is configured to perform digital operations on a three-dimensional object 202 defined by geometry data 114 included in digital content 112 in accordance with methods and techniques described herein. The system 200 may be integrated into the computing device 102 or digital environment 100 of FIG. 1 but could be integrated into an alternative device or environment. The system 200 includes a viewpoint location module 204, a viewpoint determination module 208 and a digital operation module 212.

The viewpoint location module 204 is operable to dispose multiple viewpoints (e.g., cameras) about a three-dimensional object or about a location at which the three-dimensional object 202 can be disposed thereby creating a set of candidate viewpoints 206. As used herein, the term viewpoint is used to denote a location from which a view of the three-dimensional object is established. Thus, a viewpoint is a location that is relative to the three-dimensional object, not an absolute location. As such, disposing viewpoints about a three-dimensional object can be accomplished by locating multiple virtual devices or locations (e.g., virtual cameras) about a three-dimensional object. Alternatively, a three-dimensional object can be moved (e.g., rotated) relative to one or more virtual devices or locations (e.g., virtual cameras) to dispose viewpoints about the three-dimensional object. As another alternative, viewpoints could be disposed about the three-dimensional object by a combination of the aforementioned.

The number of candidate viewpoints 206 in the set can be pre-determined or may be variable. The set of candidate viewpoints 206 typically includes at least 6, more typically at least 36, still more typically at least 108 and typically no greater than 10,000, more typically no greater than 800, still more typically no greater than 200 candidate viewpoints surrounding the three-dimensional object 202 or the space into which a three-dimensional object is to be placed. It is understood that the term surrounding, as used to refer to candidate viewpoints disposed about the three-dimensional object, means, unless otherwise specified, that the candidate viewpoints are either partially or fully surrounding the three-dimensional object or the space into which the three-dimensional object is to be located.

It is contemplated that the viewpoint location module 204 can locate the candidate viewpoints 206 about the location for the three-dimensional object or the three-dimensional object itself in variety of configurations such as according to a pattern, randomly or a combination thereof. The viewpoint location module 204 typically locates the candidate viewpoints 206 about the location of the three-dimensional object 202 or the three-dimensional object 202 itself at locations of a framework. The framework can be according to a specific geometry such as a cube, a cylinder, a capsule, an icosahedron, a cuboid or the like or can be an amorphous framework. As another alternative, the framework can be generally complementary to a three-dimensional object upon which digital operation are to be performed. For example, and without limitation, the framework can be shaped generally or more specifically like the outer surface of three-dimensional object upon which a digital operation is to be performed.

The candidate viewpoints 206 can be arranged generally uniformly about the framework or can be arranged with more candidate viewpoints clustered at certain areas of the framework. For example, and without limitation, if the three-dimensional objects tend to have greater surface contours in particular areas, then it may be desirable to have more candidate viewpoints 206 directed toward those areas. If, for example, the system is designed to texture or perform other digital operations on three-dimensional objects of many differing shapes, it might be desirable to have the viewpoints arrange more uniformly about the framework.

The viewpoint determination module 208 is then configured to select activated viewpoints 210 based on the candidate viewpoints 206. For example, one or more of the candidate viewpoints 206 are selected and activated to begin the creation of a subset of activated viewpoints. The view of the portion of the three-dimensional object viewed by each of the candidate viewpoints is evaluated by the viewpoint determination module 208 to determine if that view provides a threshold amount of additional surface information relative to the current subset of activated viewpoints. If the view satisfies the threshold amount of additional surface information, then the candidate viewpoint is activated by the viewpoint determination module 208 and added to the set of activated viewpoints. If the view fails to satisfy the threshold amount of additional surface information, then the candidate viewpoint is inactivated by the viewpoint determination module 208 thereby also creating a set of inactivated viewpoints.

The candidate viewpoints 206, in one example, are evaluated iteratively for overlap. The candidate viewpoints 206 that are evaluated are typically adjacent to activated viewpoints already in the set of activated viewpoints. Evaluating candidate viewpoints that are adjacent to activated viewpoints helps assure that the portions of the three-dimensional object viewed by those adjacent candidate viewpoints have a significant amount of overlap with the portions of the three-dimensional object viewed by activated viewpoints. As used herein, a first viewpoint (e.g., a candidate viewpoint) is considered to be adjacent to a second viewpoint (e.g., an activated viewpoint) if there are no greater than five (5), more typically no greater than three (3) and even more typically no greater than two (2) viewpoints (e.g., activated, inactivated or candidate viewpoints) closer to the second viewpoint.

Once the set of activated viewpoints 210 is initially determined, viewpoints may be added or removed from the set of activated viewpoints to refine the set of activated viewpoints by the viewpoint determination module 208. Once the set of activated viewpoints 210 is established, the set of activated viewpoints is employed by the digital operation module 212 to perform one or more digital operations on (e.g., texturing of) the three-dimensional object.

The digital operation module 212 is operable to perform on or more digital operations on three-dimensional objects. As one example, the digital operation module 212 could be used to determine a volume of a three-dimensional object. As another example, the digital operation module 212 could be used to calculate surface area of a three-dimensional object. As still another example, the digital operation module 212 is used to texture a chosen three-dimensional object with shading, colors, patterns, surface topology or the like. For this latter example, a variety of texturing programs or computer readable instructions can be employed or created to texture three-dimensional objects in accordance with techniques described herein. One example includes texture mapping (e.g., applying a 2D image such as a texture map onto the surface of 3D object). Examples that can be used separately or in conjunction with the texture mapping include brush tool, paint tools or the like of any number of available digital texturing programs.

Figure 3:
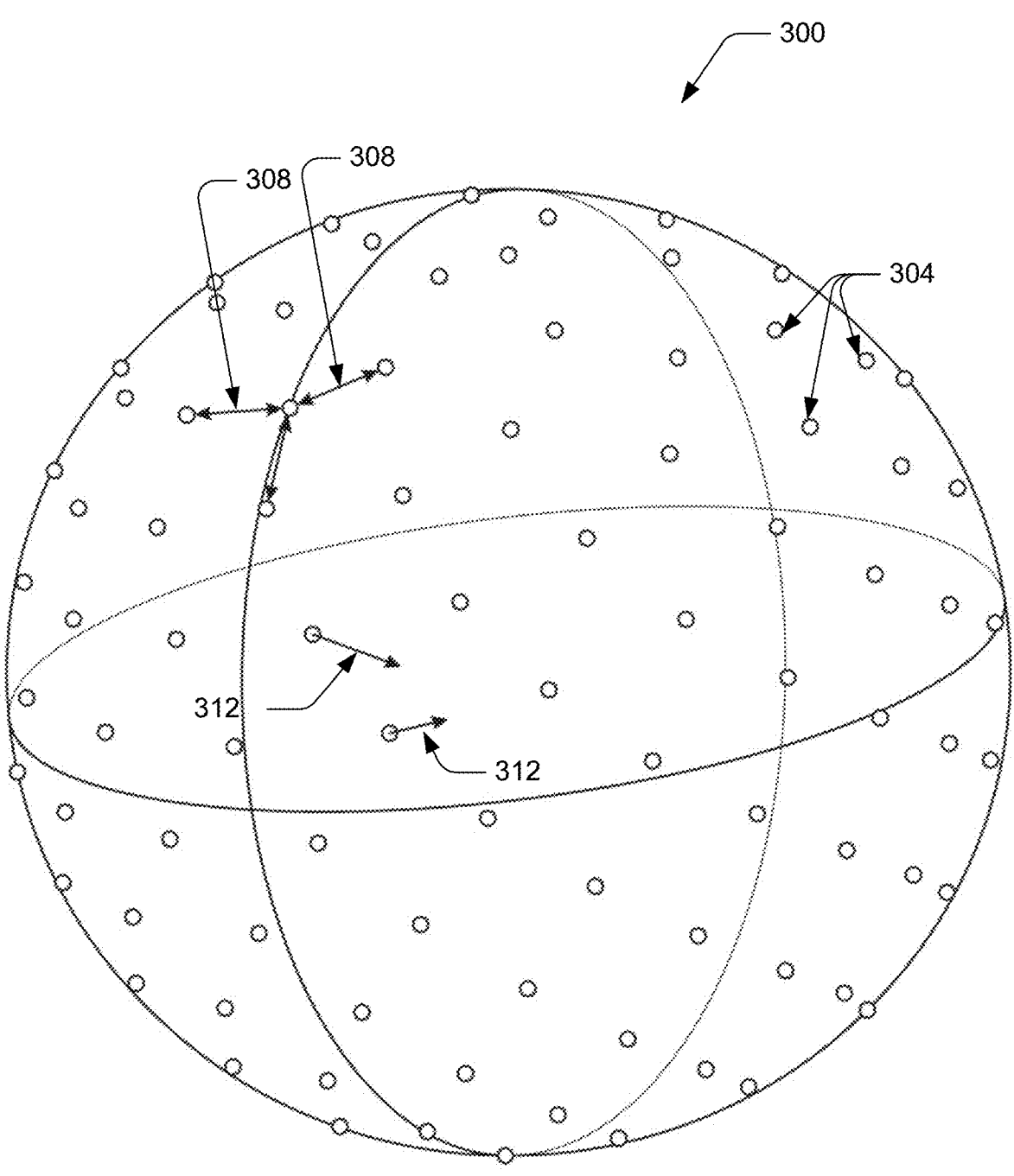
FIG. 3 illustrates an example arrangement of a set of candidate viewpoints on a framework in accordance with techniques described herein.

With reference to FIG. 3, there is illustrated an example framework 300 in the shape of a sphere with candidate viewpoints 304 scattered about the framework 300. The example framework 300 of FIG. 3 has the candidate viewpoints 304 (e.g., which correspond to candidate viewpoints 206 of FIG. 2) scattered substantially uniformly about the framework 300. In this example, each candidate viewpoint 304 is disposed at multiple distances 308 from its adjacent viewpoints 304 such that the distances 308 are within ±thirty percent, more typically ±twenty percent, still more typically ±ten percent of each other. In other words, if a chosen distance 308 between a first viewpoint and a second adjacent viewpoint is ten millimeters (mm) and the difference of distances between other adjacent candidate viewpoints 304 is ±ten percent, then the distances 308 between each of the adjacent candidate viewpoints are ten millimeters±ten percent or in a range of nine to eleven millimeters. The candidate viewpoints 304 of the example framework 300 illustrated are disposed about the spherical framework 300 according to a Fibonnacci pattern.

The candidate viewpoints 3-4 generally face or point inwardly relative the framework in which the candidate viewpoints 304 are located and/or face or point inwardly toward a three-dimensional object or a space where such objects are to be located. Thus, for example, FIG. 3 illustrates the candidate viewpoints 304 of FIG. 3 facing or pointing inwardly (see arrows 312) from the spherical framework 300 toward a three-dimensional object or a space where such geometries are to be located. The particular example candidate viewpoints 304 illustrated are configured to face or point inwardly at a direction that is orthogonal to the spherical framework 300. In this manner, multiple views of the front, back, sides, top and bottom of any three-dimensional object that is disposed entirely within the framework 300 are provided.

The techniques disclosed herein can be employed to perform digital operations on a three-dimensional object 202 that is fully or partially located within the view of the candidate viewpoints or candidate viewpoint framework. Further, those three-dimensional objects may be provided in a variety of formats. Examples of three-dimensional objects can be in the shape of, without limitation, buildings, animals, clothing, vehicles and so on. Formats suitable for the three-dimensional object include, without limitation, GL transmission format (glTF) files, Filbox (FBX) files, object replacement character (OBJ) files and so on.

Figure 4:
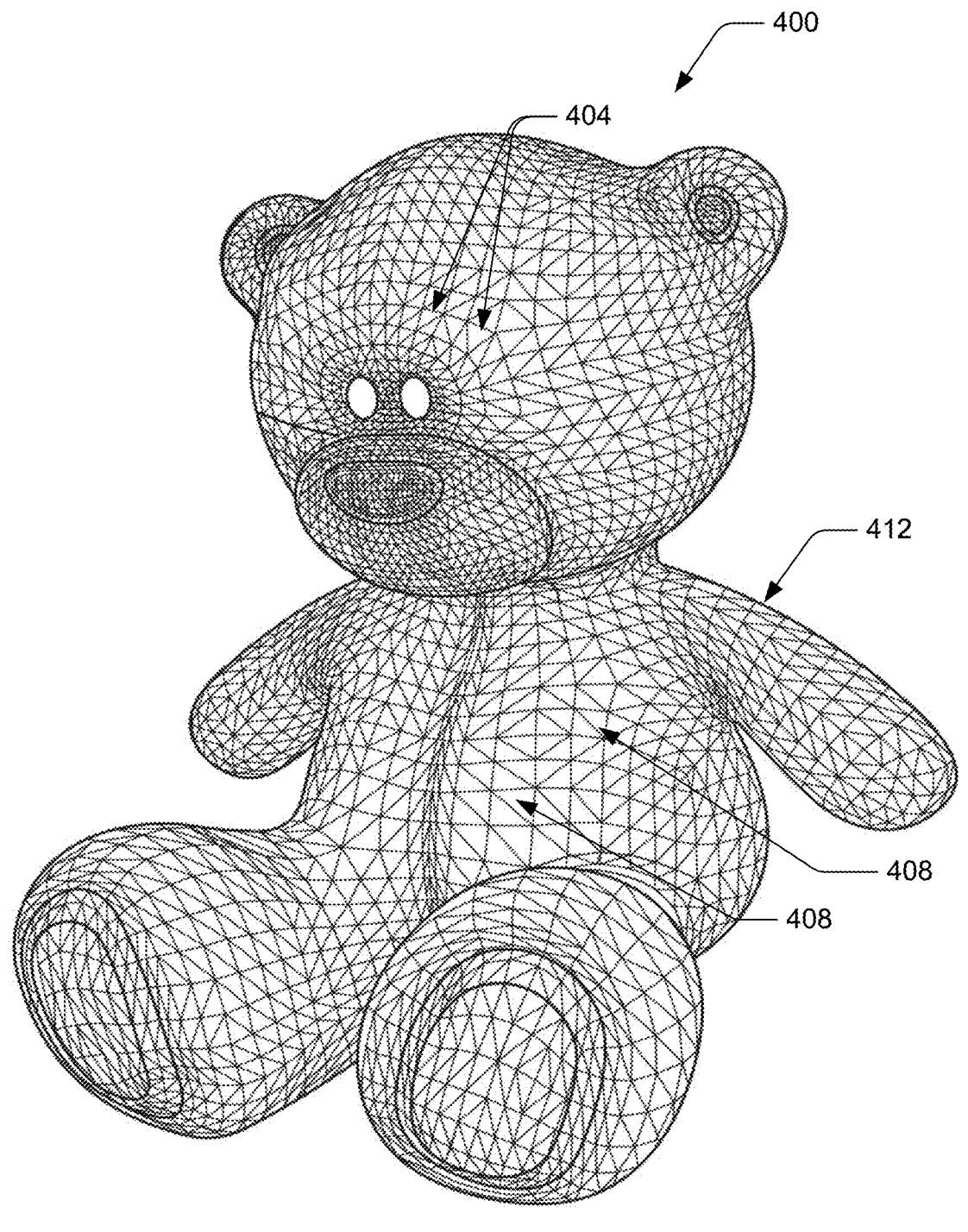
FIG. 4 illustrates an example of a three-dimensional object upon which digital operation can be performed in accordance with techniques described herein.

An example three-dimensional object 400 is shown in FIG. 4 a three-dimensional mesh. As can be seen, the example three-dimensional object 400 is configured in the shape of a teddy bear. The three-dimensional object 400 is represented as a three-dimensional mesh formed of virtual threads 404 that form panes 408 defining an outer surface 412 of the three-dimensional object 400.

Referring back to FIG. 2, the viewpoint determination module 208 is operable to select viewpoints from the set of candidate viewpoints 206 to create a subset of activated viewpoints 210. Like the original set of candidate viewpoints 206, the subset of activated viewpoints 210 is disposed about and/or surrounds the three-dimensional object 202. Again, it is understood that the term surrounding, as used to refer to activated viewpoints disposed about the three-dimensional object, means that the activated viewpoints are either partially or fully surrounding the three-dimensional object unless otherwise specifically stated.

The number of activated viewpoints 210 in this subset of activated viewpoints is dependent upon a complexity of the three-dimensional object 202 upon which a digital operation is to be performed. For example, a complex three-dimensional object (i.e., a three-dimensional object having an outer surface that is highly contoured (e.g., has many curves, slopes, or other surface variations)) might have a larger subset of activated viewpoints than a simpler three-dimensional object (i.e., a three-dimensional object having an outer surface that is less contoured (e.g., has fewer curves, slopes or other surface variations)).

Example Procedure

Figure 5:
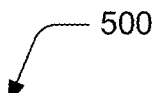
FIG. 5 illustrates a flow diagram of an example methodology for determining viewpoints for performing digital operation on a three-dimensional object in accordance with techniques described herein.

With reference to FIG. 5, there is illustrated a flowchart of a step-wise procedure 500 of determining activated viewpoints for performing a digital operation on a three-dimensional object. As can be seen at block 502, a set of candidate viewpoints is disposed about the three-dimensional object. Then, at block 504, a subset of activated viewpoints is determined from the original set of viewpoints. Then, at block 506, this subset of activated viewpoints is used to perform one or more digital operations on the three-dimensional object.

Figure 6:
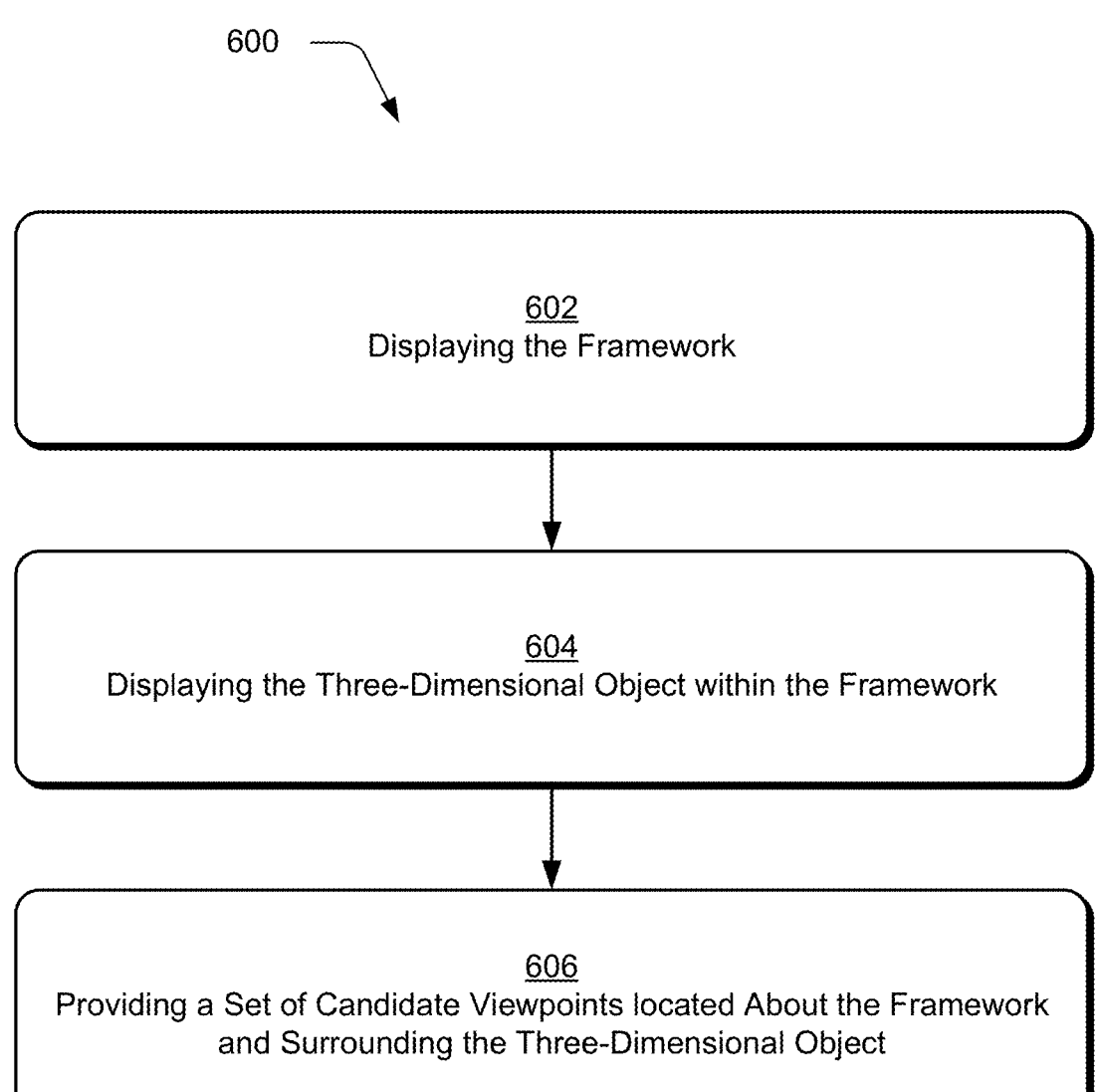
FIG. 6 illustrates a flow diagram of an example methodology for disposing a set of candidate viewpoints about a three-dimensional object in accordance with techniques described herein.

With reference to FIG. 6, an example methodology or technique 600 for disposing the set of activated viewpoints about the three-dimensional object is illustrated. At block 602, a three-dimensional framework is displayed upon a screen of a computer device. That framework, at block 604, is disposed about a three-dimensional object such that the framework surrounds the three-dimensional object. Further, at block 606, a set of candidate viewpoints is established about the three-dimensional object and are typically disposed at locations on the framework. It shall be understood that the steps represented by blocks 602, 604 and 606 of the illustrated procedure 600 can be performed in different orders depending upon the user preference. For example, the set of candidate viewpoints can be established and then the three-dimensional object can be located relative to the candidate viewpoints such that the candidate viewpoints surround the geometry. As another example, the three-dimensional framework might be established after the set of candidate viewpoints is disposed about the three-dimensional object. The set of candidate viewpoints can be located about the three-dimensional object in a framework that is established separate from the candidate viewpoints. Alternatively, a framework may be established by the candidate viewpoints. In other words, the arrangement of the candidate viewpoints about the three-dimensional object can establish the framework.

Figure 7:
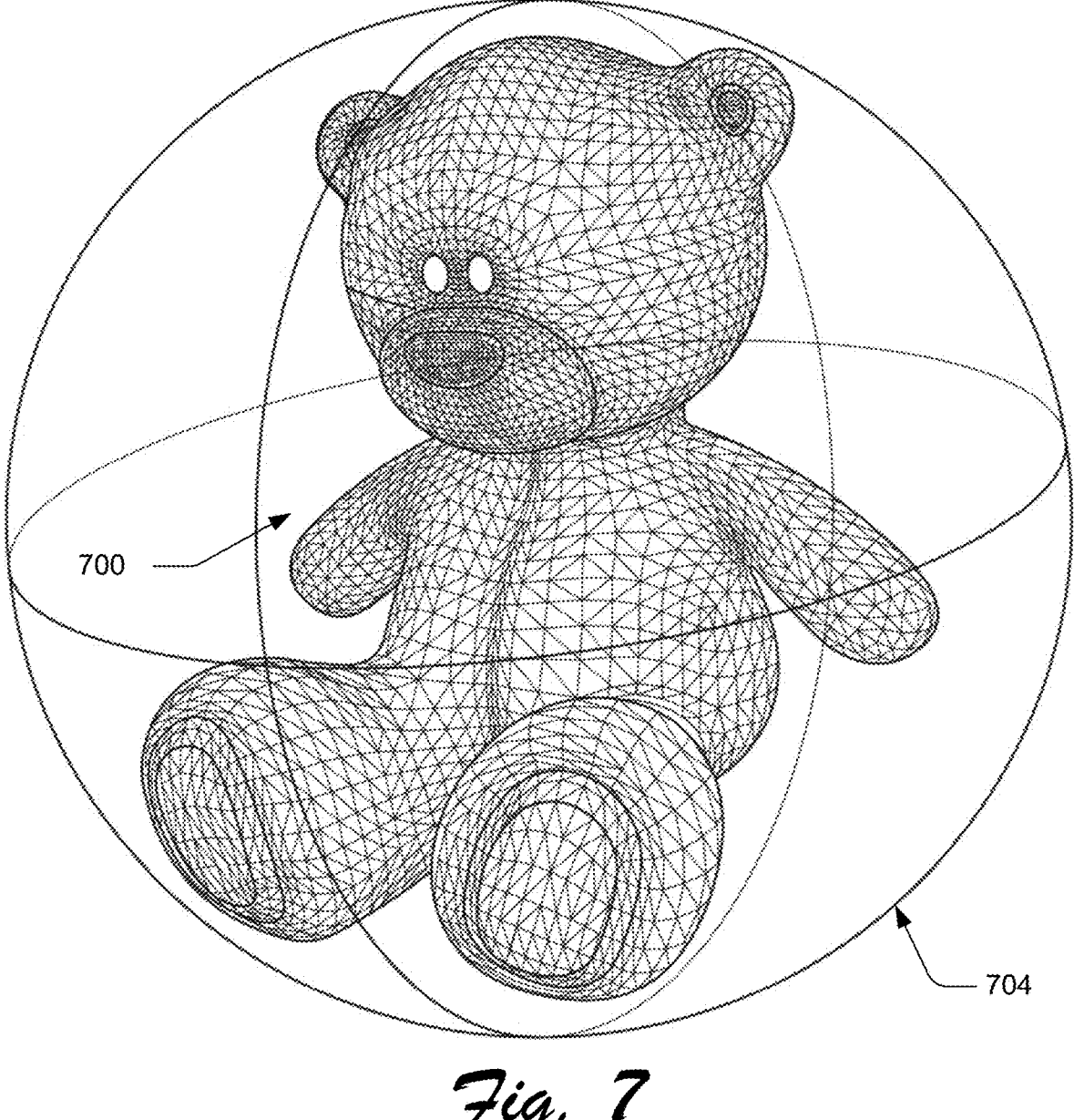
FIG. 7 illustrates an example of a three-dimensional object disposed within an example framework in which viewpoints can be located in accordance with techniques described herein.

In the example shown in FIG. 7, a three-dimensional object 700 is shown as a three-dimensional mesh rendering of a teddy bear. It will be understood that the viewpoints can be disposed about the three-dimensional object to surround the three-dimensional object 700. Although not required, unless otherwise stated, the candidate viewpoints are typically spaced about a framework 704 that also surrounds the three-dimensional object. It is understood that the term surround or its conjugations, as used to refer to candidate viewpoints and a framework disposed about the three-dimensional object, means that the viewpoints are either partially or fully surrounding the three-dimensional object unless otherwise specifically stated. In FIG. 7, the candidate viewpoints (not shown) are disposed at locations of the spherical framework 702 according to a Fibonnacci series (like those shown in FIG. 3) and both the candidate viewpoints, and the spherical framework 702 in which the viewpoints lie, entirely surround the three-dimensional object 700.

Disposing the candidate viewpoints and framework about the three-dimensional object can be done in a variety of ways. In one instance, the framework and location of the candidate viewpoints is established (e.g., displayed on a computer screen) and then the three-dimensional object is located to allow those candidate viewpoints and/or framework to surround the three-dimensional object. Alternatively, the three-dimensional object can be located as desired (e.g., displayed on a computer screen) and the candidate viewpoints and/or framework can be disposed about the three-dimensional object.

Once the set of candidate viewpoints and/or framework are disposed about the three-dimensional object, a subset of activated viewpoints is determined from the set of candidate viewpoints so that the subset of activated viewpoints can be used to perform one or more digital operations on the three-dimensional object. FIG. 8 illustrates a flow diagram of an example methodology or technique 800 for determining this subset of activated viewpoints.

According to the example procedure 800, a subset of activated viewpoints of the set of candidate viewpoints is determined by the following steps: i) at block 802, surface data for the three-dimensional object is determined as provided by the set of candidate viewpoints; ii) at block 804, overlap of surface data provided by the set of candidate viewpoints is then determined; and iii) then, at block 806, a subset of activated viewpoints from the original set of viewpoints is determined based on limiting overlap of the surface data. These steps may be undertaken in various orders and may be selectively repeated. In one example, these steps represented by blocks 802, 804, 806 are performed iteratively for the candidate viewpoints of the set of candidate viewpoints to iteratively activate and add activated viewpoints to the subset of activated viewpoints. In other words, candidate viewpoints are analyzed to determine if they will become activated viewpoints thereby creating the set of activated viewpoints. At the same time, at least some of the candidate viewpoints are not activated and not added to the subset of activated viewpoints thereby creating or determining a set of inactivated viewpoints. Then, if desired, some of the inactivated viewpoints that were part of the original set of candidate viewpoints (i.e., viewpoints not already selected for the subset of activated viewpoints) may be added to the subset of activated viewpoints if those inactivated viewpoints provide a desired amount of additional surface data at block 808.

In one example, a set N of candidate viewpoints is established about a three-dimensional object and the set N of candidate viewpoints is iteratively tested for the ability of that viewpoint to provide additional surface data of the three-dimensional object. In the example, surface data of the three-dimensional object from a first candidate viewpoint $(n_1)$ is determined followed by determining surface data of the three-dimensional object from a second candidate viewpoint $(n_2)$ that is adjacent the first candidate viewpoint $(n_1)$. If the surface data for the second candidate viewpoint $(n_2)$ provides a threshold amount of additional surface data for three-dimensional object, then the second candidate viewpoint $(n_2)$ is added to the first candidate viewpoint $(n_1)$ to begin generation of the subset S of activated viewpoints that is used to perform on or more digital operations on the three-dimensional object. If the additional surface data provided by the second candidate viewpoint $(n_2)$ is below a threshold amount, the second candidate viewpoint $(n_2)$ is inactivated from the subset S of activated viewpoints that will be used to perform one or more digital operations the three-dimensional object. Then, a third candidate viewpoint $(n_3)$ adjacent to the second candidate viewpoint $(n_2)$ is selected and the surface data provided by the third candidate viewpoint $(n_3)$ is determined. If the surface data from the third candidate viewpoint $(n_3)$ provides at least a threshold amount of additional surface data relative to the activated viewpoint[s] currently part of subset S of activated viewpoints, then the third candidate viewpoint $(n_3)$ is added to the subset S of activated viewpoints. If the additional surface data provided by the third candidate viewpoint $(n_3)$ is below a threshold amount, the third viewpoint $(n_3)$ is inactivated from the subset S of activated viewpoints. This process continues through the set N of candidate viewpoints iteratively $(n_1, n_2, n_3 \ldots n_x)$ until each candidate viewpoint of the set N of candidate viewpoints has either been activated to or inactivated from of the subset S of activated viewpoints. In this way, a subset of S of activated viewpoints and a subset T of inactivated viewpoints are determined so that the set S of activated viewpoints can be used to perform the one or more digital operation on the three-dimensional object without using the set T of inactivated viewpoints to perform those digital operations on the three-dimensional object.

Figure 9:
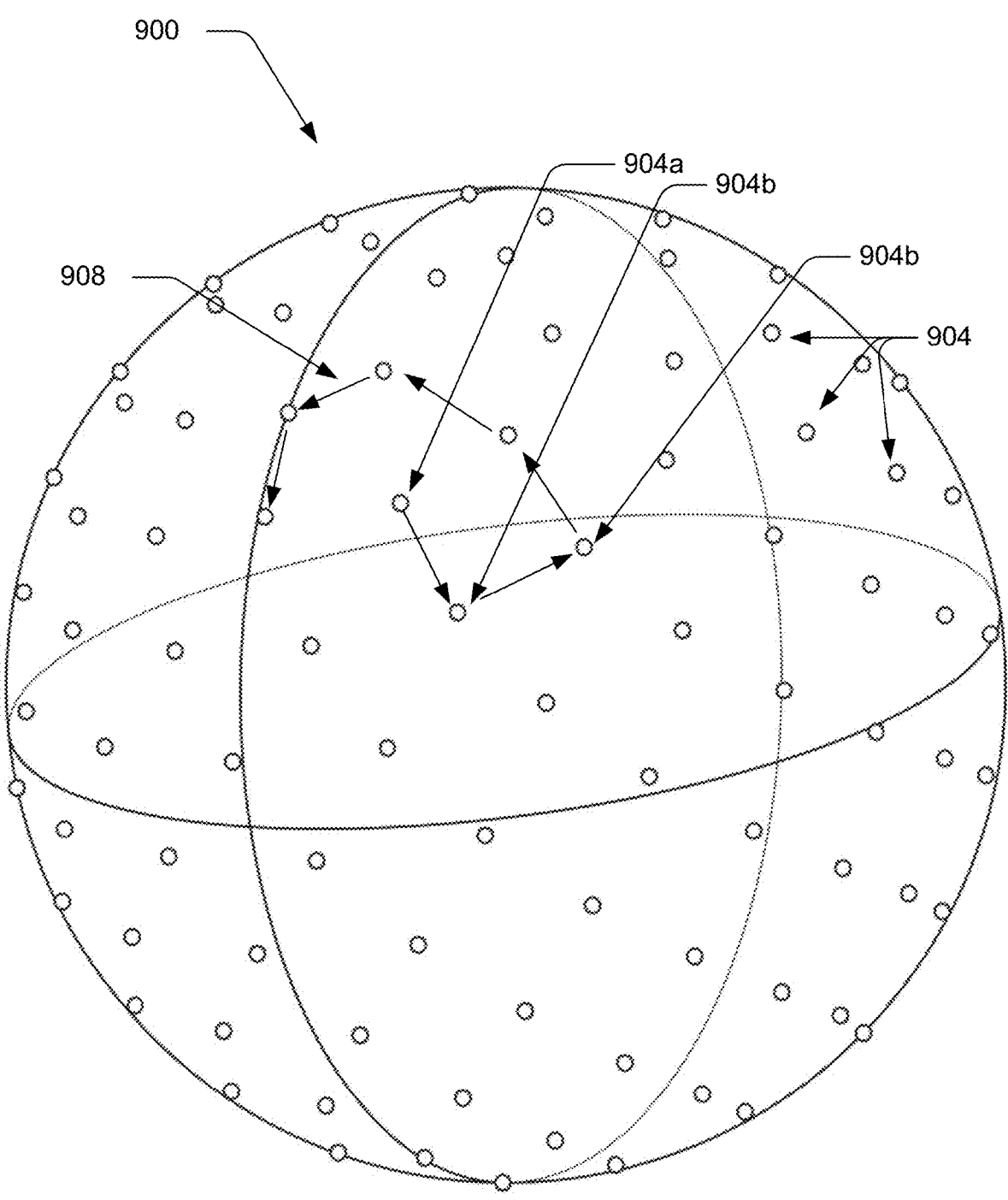
FIG. 9 is an example of an arrangement of candidate viewpoints from which activated viewpoints are being selected in accordance with techniques described herein.

A specific example of this determination of a subset of activated viewpoints and a subset of inactivated viewpoints is illustrated in FIG. 9. A spherical viewpoint framework 900 is depicted having viewpoints 904 arranged in a Fibonnacci series, e.g., similar to that in FIG. 3. A first candidate viewpoint 904a is selected and the surface data provided by the first candidate viewpoint 904a is determined. Then a second candidate viewpoint 904b adjacent to the first candidate viewpoint 904a is selected and the surface data from that second candidate viewpoint 904b is also determined.

If the surface data from the second candidate viewpoint 904b provides at least a threshold value of additional surface data relative to the surface data provided by the first candidate viewpoint 904a, then the second candidate viewpoint 904b is added to the first candidate viewpoint 904a to begin the generation of the subset S of activated viewpoints 904. If the additional surface data provided by the second candidate viewpoint is below a threshold value, the second candidate viewpoint 904*b* is inactivated from the subset S of viewpoints and is deemed an inactivated viewpoint 904.

Then, a third candidate viewpoint 904*c* is selected and the surface data provided by the third candidate viewpoint 904*c* is determined. If the surface data from the third viewpoint 904*c* provides at least a threshold value of additional surface data relative to the activated viewpoints currently part of subset S of activated viewpoints, then the third candidate viewpoint is added to the subset S of activated viewpoints. If the additional surface data provided by the third candidate viewpoint is below a threshold amount, the third viewpoint is inactivated from the subset S of viewpoints and is deemed an inactivated viewpoint. This process continues through all the candidate viewpoints 904 on the framework 900 or the entire set N of candidate viewpoints 904 have been activated or inactivated and a subset S of activated viewpoints 904 and a subset T of inactivated viewpoints 904 is established.

In the example of FIG. 9, the adjacent candidate viewpoints 904 are selected iteratively in a helical or spiral pattern 908. Each successive adjacent candidate viewpoint is selected according to the helical pattern until each candidate viewpoint 904 of the original set of candidate viewpoints 904 has been either activated to or inactivated from the subset S of candidate viewpoints 904. Notably, the adjacent candidate viewpoints 904 are also selected iteratively based upon based on that subsequent candidate viewpoint 904 being the closest candidate viewpoint 904 to the first selected candidate viewpoint 904*a* that is also adjacent to the previously selected candidate viewpoint 904. While these techniques for iteratively choosing candidate viewpoints to be analyzed for additional surface data are illustrated as being applied to candidate viewpoints disposed about a spherical framework, these techniques can also be applied to candidate viewpoints disposed about alternatively shaped frameworks.

The skilled artisan will understand, based upon this disclosure, that various mathematical constructs or algorithms can be used for activating or inactivating candidate viewpoints to generate the subset of activated viewpoints and the subset of inactivated viewpoints. In general, each candidate viewpoint views a portion of the surface of the three-dimensional object and provides surface data for that portion of the surface data. The portion of the surface is typically divided into sections and the surface data provides a value for each section of the portion of the surface viewed by the candidate viewpoint. The values for the sections are calculated by determining the degree to which each section of the portion of the surface of the three-dimensional object is normal or perpendicular to the view of the candidate viewpoint. In other words, the value of the view of the sections and/or portions of the surface of the three-dimensional object is determined at least in part by how directly the candidate viewpoints views that sections and or portions.

Generally, the views of sections and/or portions of the surface of the three-dimensional object are considered to be better the closer to normal or perpendicular to the views of the candidate viewpoints are to the surface of those sections and/or portions. As such, value[s] for the views of surfaces of sections and/or portions provided by a chosen candidate viewpoint are assigned depending upon how close to normal those views are to the surfaces of the sections and/or portions that they view. The values for the views of the sections are kept during the generation of the subset of activated viewpoints. Thus, for each subsequent candidate viewpoint of the set of candidate viewpoints that is evaluated, the subsequent candidate viewpoint will view a subsequent portion of the three-dimensional object and the sections of that subsequent portion will overlap with (e.g., be the same as) sections of the portions viewed by activated viewpoints in the set of activated viewpoints. The subsequent candidate viewpoint may also provide views of sections not included in the portions viewed by activated viewpoints of the subset S of activated viewpoints. The quality of these views is evaluated as described above and an overall value is then assigned to the view provided by the subsequent candidate viewpoint. If that overall value is at or above a threshold value, then the subsequent candidate viewpoint is activated and added to the subset of activated viewpoints. If that overall value is below the threshold value, then the subsequent viewpoint is inactivated, if desired, and can be added to a subset of inactivated viewpoints.

It is understood that, as used herein, activated or inactivated are designations that are used to tell which viewpoints will actually be used to perform one or more digital operation on a chosen three-dimensional object. Unless otherwise stated, there is no requirement that the viewpoints be turned on or off or otherwise be powered up or down to be considered activated or inactivated. For example, it could be the case that all activated viewpoints remain turned on while inactivated viewpoints are turned off, but it could also be case that all of the viewpoints remain turned on, but the activated viewpoints are used or designated to be used for performing one or more digital operations on a chosen three-dimensional object while the inactivated viewpoints are not used.

Through the techniques described herein, it will be understood that the subset of activated viewpoints provides less overlapping surface data for a three-dimensional object than is provided by using the entire set of candidate viewpoints. In this manner, the number of viewpoints (i.e., the activated viewpoints) used to perform a digital operation on a three-dimensional object is less than using all viewpoints (i.e., all candidate viewpoints) of an overall set of viewpoints. At the same time, choosing the activated viewpoints based upon the additional surface data that they provide allows for a high level of confidence that the activated viewpoints are adequate for providing a sufficient view of the outer surface of the selected three-dimensional object for performing one or more digital operations thereon.

As candidate viewpoints are activated to the subset S of activated viewpoints, an overall confidence value may be maintained for the overall view of subset of activated viewpoints. Various mathematical constructs and/or algorithms can be used for maintaining this overall confidence value. For example, and without limitation, as values of additional surface data are calculated for the points, sections and portions of the candidate viewpoints, those values can, as desired, be added or otherwise factored into the overall confidence value. This overall confidence value can then be tracked and the amount of potential change that a subsequent candidate viewpoint produces for that overall confidence value can be determined. Then, for example, this potential change can be analyzed as to whether it satisfies a threshold value for providing additional surface data. Example possible uses of such a confidence value are discussed herein.

Figure 10:
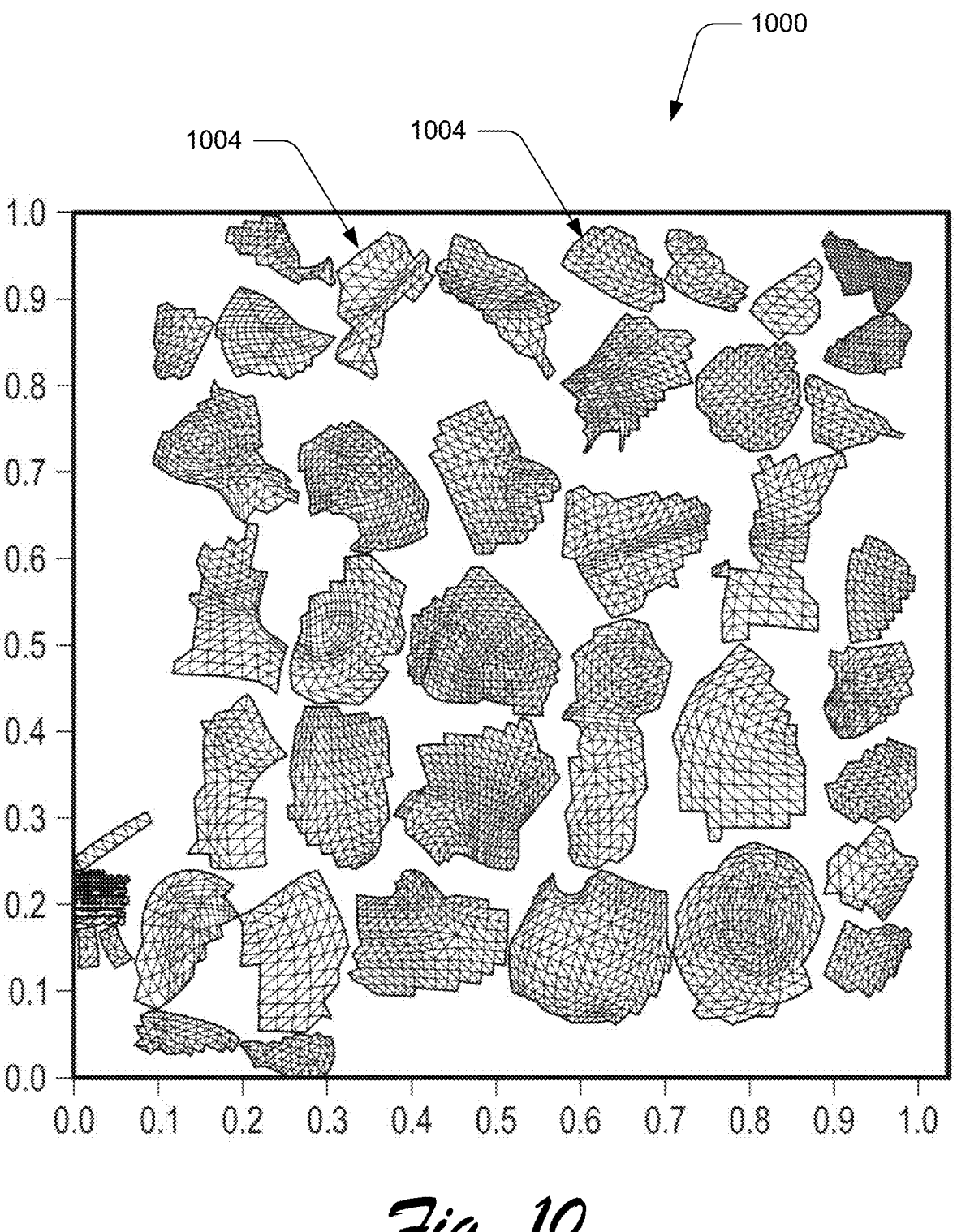
FIG. 10 illustrates example two dimensional views of portions of a three-dimensional object in accordance with techniques described herein.

With reference to FIG. 10 one example technique for determining the subset S of activated viewpoints employs one or more UV maps 1000. As can be seen, each portion 1004 of a three-dimensional object that is viewed by each subsequent candidate viewpoint is disposed on a UV axis graph. These portions 1004 are divided into sections (not shown), which, in this example, are defined as sections of the portions 1004 with each section being the section of the surface viewed by one pixel of the candidate viewpoint. A value is assigned to each point of each section of its respective portions 1004 as viewed by a viewpoint. The value for each point is determined depending upon how "well" the viewpoint views that point of the portion 1004. For example, at each point, the surface of the three-dimensional object will be normal or offset from normal relative to the view of the viewpoint. The closer to normal the surface is to the view of the viewpoint at a selected point, the better the ability of the candidate viewpoint to view that point on the surface of the three-dimensional object. Based on this ability to view a particular point, values can be assigned to each point. Those values can then be factored into a determination of a value for each section and the values for each section can be factored into a determination of a value for the portions 1004 of the surface of the three-dimensional object seen by the candidate viewpoint. In one example calculation, the values of each of the points are added to get a value for the section in which those points lie and the values of each section are added to result in a value for the portion 1004 seen by the candidate viewpoint.

For each subsequent candidate viewpoint, the points or the sections to which the values are assigned may be for points or sections that are already viewed by the activated viewpoints in the subset S of activated viewpoints. These are referred to herein as overlapping points or sections and generally as overlapping surface data. The value assigned to any overlapping point or section in this example represents any improvement in the ability of the subsequent viewpoint to view that point or section. For example, and without limitation, if a value of eight (8) is assigned to a particular overlapping point or section as viewed by the activated viewpoints, and a value of ten (10) is assigned to that overlapping point or section as viewed by a subsequent viewpoint, the subsequent viewpoint offers an improvement of two (2) for viewing the overlapping point or section. For any previously unviewed points or sections (i.e., points or sections not viewed by the current set of activated viewpoints) viewed by a subsequent viewpoint, a value can be assigned as discussed above. It shall be understood that both the improvement in view of points and/or sections and the views of previously unviewed points and/or sections are considered herein to be additional surface data.

Using these values of surface data, a value of improvement (i.e., ability to provide additional surface data) in viewing the three-dimensional object provided by each subsequent candidate viewpoint can be assigned to that subsequent candidate viewpoint relative to the overall confidence value that is kept for the subset S of activated viewpoints (i.e., the overall ability of the activated viewpoints to view the three-dimensional object). If the value of improvement (i.e., the amount of additional surface data) satisfies a threshold value for providing additional surface data, then the subsequent candidate viewpoint is activated and added to the subset S of activated viewpoints and the overall confidence is updated. If the value of improvement does not satisfy the threshold value for providing additional surface data, then the subsequent viewpoint is inactivated, and the overall confidence value is not updated. In this manner, the subset S of activated viewpoints of the original set N of candidate viewpoints is established.

As an example of a threshold value for providing additional surface data, a candidate viewpoint will be added to the subset S of activated viewpoints if at least 10%, more typically at least 25% and even more typically at least 35% of its points or sections provide additional surface data. Said another way, if at least 10%, more typically at least 25% and even more typically at least 35% of the points or sections of a portion displayed on a UV map from a candidate viewpoint provide additional surface data (e.g., a view of a point or section that is not currently viewed by the subset of activated viewpoints or an improvement of the view of an overlapping point or section), then the candidate viewpoint is added to the subset S of activated viewpoints. As used herein, an improvement of the view of an overlapping section means that the surface of that point or section, in totality, is disposed at least to some degree more normal to the candidate viewpoint than any view of that point or section already viewed by the subset S of activated viewpoints.

While, in its base case, any degree of improvement is included in this calculation, it is understood that it may be desirable to have a minimum degree of improvement for a view of section. For instance, a value (e.g., a summation) of the number of points of a section for which the candidate viewpoint provides a better (i.e., more normal) view than the subset S of activated viewpoints can be calculated. If that value is then at or above a threshold value, the view of that section by the candidate viewpoint is considered to be improved, but if it is below that value then view of that section by the candidate viewpoint is not considered to be improved. In such a calculation, the value is a percentage of the points of the section for which the view by the candidate viewpoint is improved and that percentage is typically at least 60%, more typically at least 80% and more typically at least 90%.

The subset S of activated viewpoints determined in this manner may be the final subset of activated viewpoints for performing one or more digital operations on the three-dimensional object or it may be an initial subset S of activated viewpoints that can be supplemented or reduced. In the instance that the subset S of viewpoints is an initial subset of activated viewpoints, it will be understood that any technique for establishing the initial subset S of activated viewpoints from the original set N of candidate viewpoints will inherently also establish a subset T of inactivated viewpoints (i.e., viewpoints not selected by the first process). In one example, a process is used to review the surface data provided by the inactivated viewpoints of the subset T of inactivated viewpoints and determine if any of those inactivated viewpoints are to be added to the subset S of activated viewpoints that is to be used to perform one or more digital operations on the three-dimensional object.

The inactivated subset T of viewpoints includes all or any portion of the set N of candidate viewpoints that were not activated to the subset S of activated viewpoints. Each inactivated viewpoint of the subset T of inactivated viewpoints is evaluated to determine if it adds a threshold amount of additional surface data of the three-dimensional object relative to the subset S of activated viewpoints. If an inactivated viewpoint is determined to provide at least the threshold amount of additional surface data, then the inactivated viewpoint is added to the subset S of activated viewpoints.

The skilled artisan will understand that various calculations or constructs can be employed to determine if any inactivated viewpoints of set T of inactivated viewpoints are activated and added to the subset S of activated viewpoints. As an example, the view of the points or sections of each portion of each of the inactivated viewpoints can be analyzed relative to the view provided by the subset S of activated viewpoints.

For each inactivated viewpoint, the points or the sections to which the values are assigned may be for points or sections that are already viewed by the activated viewpoints in the subset S of activated viewpoints. These are referred to herein as overlapping points or sections and generally as overlapping surface data. The value assigned to any overlapping point or section in this example represents any improvement in the ability of the inactivated viewpoint to view that point or section. For example, and without limitation, if a value of eight (8) is assigned to a particular overlapping point or section as viewed by the activated viewpoints, and a value of ten (10) is assigned to that overlapping point or section as viewed by a subsequent viewpoint, the subsequent viewpoint offers an improvement of two (2) for viewing the overlapping point or section. For any points or sections viewed by a subsequent viewpoint that were not previously viewed by the set of activated viewpoints, a value can be assigned as discussed above. It shall be understood that both the improvement in view of points and/or sections and the views of points or sections that are not currently viewed by set of activated viewpoints are considered herein to be additional surface data. Of course, since inactivated viewpoints are being analyzed for a second time, the surface data of the inactivated viewpoints have been analyzed previously, however, this surface data provided by the inactivated viewpoints is still be considered additional relative to the surfaced data of the views of the subset S of activated viewpoints.

Using these values of surface data, a value of improvement in viewing the three-dimensional object provided by each subsequent inactivated viewpoint can be assigned to that inactivated viewpoint relative to the overall confidence value that is kept for the subset S of activated viewpoints. If the value of improvement satisfies a threshold value for providing additional surface data, then the inactivated viewpoint is activated and added to the subset S of activated viewpoints. If the value of improvement does not satisfy the threshold value for providing additional surface data, then the inactivated viewpoint remains inactivated. In this manner, the subset S of activated viewpoints of the original set N of candidate viewpoints is further established.

As an example of a threshold value for providing additional surface data, an inactivated viewpoint will be added to the subset S of activated viewpoints if at least 2%, more typically at least 4% and even more typically at least 5% of its points or sections provide additional surface data. Said another way, if at least 2%, more typically at least 4% and even more typically at least 5% of the points or sections of a portion displayed on a UV map from a candidate viewpoint provide additional surface data (e.g., an improvement of the view of an overlapping point or section), then the inactivated viewpoint is added to the subset S of activated viewpoints. As used herein, an improvement of the view of an overlapping section means that the surface of that point or section, in totality, is disposed at least to some degree more normal to the inactivated viewpoint than any view of that point or section already viewed by the subset S of activated viewpoints.

While, in its base case, any degree of improvement is included in this calculation, it is understood that it may be desirable to have a minimum degree of improvement for a view of section. For instance, a value (e.g., a summation) of the number of points of a section for which the inactivated viewpoint provides a better (i.e., more normal) view than the subset S of activated viewpoints can be calculated. If that value is then at or above a threshold value, the view of that section by the inactivated viewpoint is considered to be improved, but if it is below that value then view of that section by the candidate viewpoint is not considered to be improved. In such a calculation, the value is a percentage of the points of the section for which the view by the candidate viewpoint is improved and that percentage is typically at least 60%, more typically at least 80% and more typically at least 90%.

As an additional or alternative example of a threshold value for providing additional surface data, an inactivated viewpoint will be added to the subset S of activated viewpoints if at least 0.01%, more typically at least 0.05% and even more typically at least 0.08% of its points or sections provide additional surface data. Said another way, if at least 0.01%, more typically at least 0.05% and even more typically at least 0.08% of the points or sections of a portion displayed on a UV map from an inactivated viewpoint provide additional surface data (e.g., an improved view of a point or section that is already viewed or a view of a section not currently viewed by the subset S of activated viewpoints), then the inactivated viewpoint is added to the subset S of activated viewpoints. As used herein, an improvement of the view of an overlapping section means that the surface of that point or section, in totality, is disposed at least to some degree more normal to the candidate viewpoint than any view of that point or section already viewed by the subset S of activated viewpoints.

It is contemplated that inactivated viewpoints can be analyzed and/or activated and/or added to the subset S of activated viewpoints iteratively. It is also contemplated that the inactivated viewpoints can be analyzed and/or activated and/or added to the subset S of activated viewpoints batch-wise.

Whether the subset S of activated viewpoints is determined by a single or multiple processes, the subset S of activated viewpoints will almost always be a portion or percentage of the original set N of candidate viewpoints. For example, subset S of viewpoints could be an eighty (80) viewpoint subset and could represent 80% of an original set N of 100 viewpoints. Typically, the subset of activated viewpoints is at least 2%, more typically at least 4% and even more typically at least 5%, but typically no greater that 70%, more typically no greater than 50% and even more typically no greater than 30% of the original set of candidate viewpoints. Advantageously, the technique described herein can provide for accurate views of three-dimensional objects with relatively low numbers of viewpoints.

It will be understood that the terms and phrases describing one type of viewpoints (i.e., candidate viewpoints, activated viewpoints, inactivated viewpoints and so on) are also describing the other types of viewpoints in certain circumstances. For example, terms and phrases describing candidate viewpoints also often describe activated and/or inactivated viewpoints since candidate viewpoints become activated or inactivated viewpoints.

It is contemplated that a variety of digital operations can be performed upon the three-dimensional object using the views and viewpoints, particularly the subset of activated viewpoints established using the techniques described herein. As one example, the subset of activated viewpoints could be used to determine a volume of a three-dimensional object. As another example, the subset of activated viewpoints could be used to calculate surface area of a three-dimensional object. Such digital operations can be carried out using known mathematical operations that employ the information gained from the views of the subset of activated viewpoints.

The subset of activated viewpoints can additionally or alternatively be employed to texture a chosen three-dimensional object with shading, colors, patterns, surface topology, combinations thereof or the like. Texturing of the three-dimensional object can be accomplished using multiple techniques. One example includes texture mapping (e.g., applying a 2D image such as a texture map onto the surface of 3D object). Examples that can be used separately or in conjunction with the texture mapping include brush tool, paint tools or the like of any number of available digital texturing programs. As discussed above, the texturing can be carried out with the digital operations module. Moreover, as used herein, texturing of a three-dimensional object means providing coloring and/or shading to the outer or outwardly facing surface of the three-dimensional object. However, if specifically stated, texturing can additionally refer to providing topographical features (e.g., corrugations, fur or the like) to the outwardly facing surface of the three-dimensional object.

Example System and Device

Figure 11:
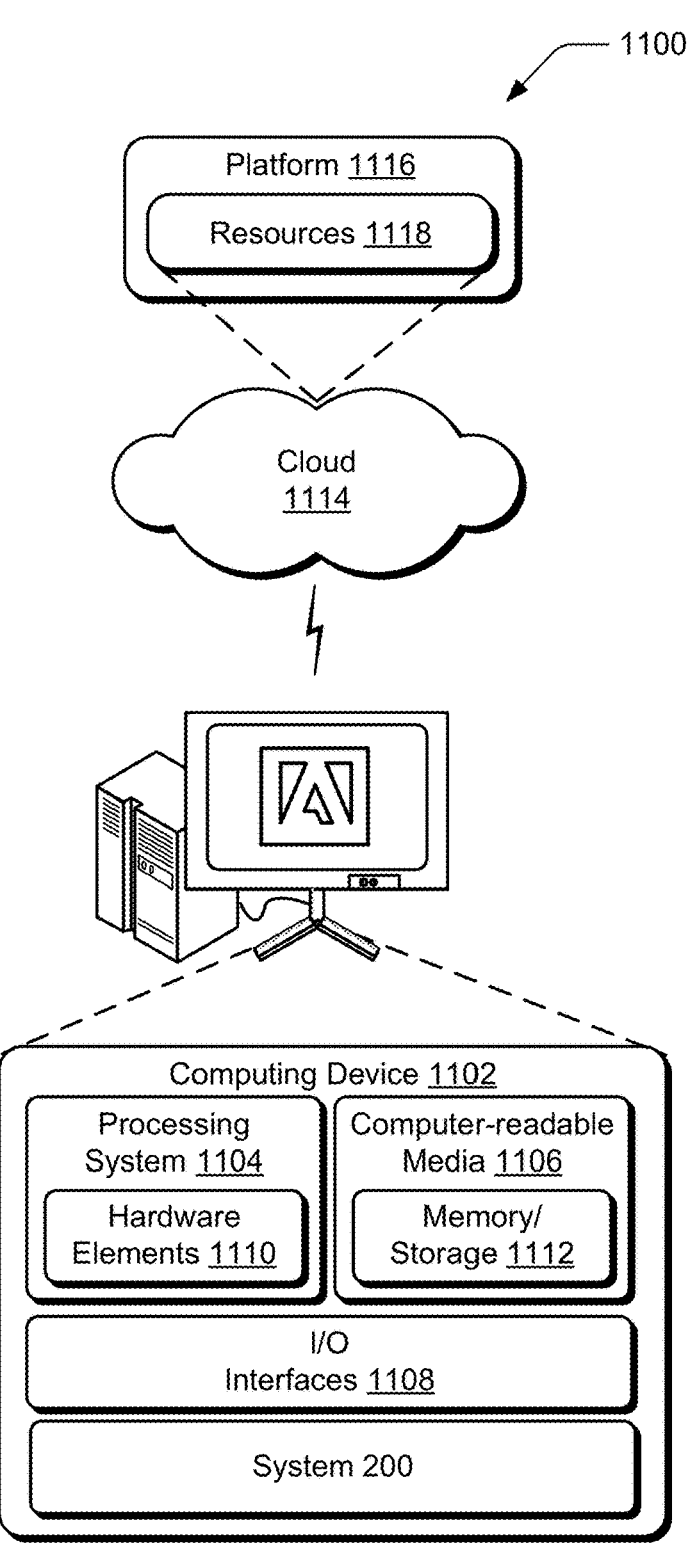
FIG. 11 illustrates an example system that includes an example computing device that is representative of one or more computing systems and/or devices for implementing the various techniques described herein.

FIG. 11 illustrates an example system 1100 that includes an example computing device 1102 that is representative of one or more computing systems and/or devices that are usable to implement the various techniques described herein. This is illustrated through inclusion of the system 200 from FIG. 2 in FIG. 11, which can include the viewpoint location module and a viewpoint determination module. The computing device 1102 includes, for example, a server of a service provider, a device associated with a client (e.g., a client device), an on-chip system, and/or any other suitable computing device or computing system.

The example computing device 1102 as illustrated includes a processing system 1204, one or more computer-readable media 1206, and one or more I/O interfaces 1208 that are communicatively coupled, one to another. Although not shown, the computing device 1202 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that are configured as processors, functional blocks, and so forth. This includes example implementations in hardware as an application specific integrated circuit or other logic device formed using one or more semiconductors. The hardware elements 1210 are not limited by the materials from which they are formed, or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1206 is illustrated as including memory/storage 1212. The memory/storage 1212 represents memory/storage capacity associated with one or more computer-readable media. In one example, the memory/storage 1212 includes volatile media (such as random access memory (RAM)) and/or nonvolatile media (such as read only memory (ROM), Flash memory, optical disks, magnetic disks, and so forth). In another example, the memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1210. For example, the computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supportable by various configurations of the computing device 1202 and are not limited to the specific examples of the techniques described herein. This functionality is also implementable entirely or partially through use of a distributed system, such as over a "cloud" 1214 as described below.

The cloud 1214 includes and/or is representative of a platform 1216 for resources 1218. The platform 1216 abstracts underlying functionality of hardware (e.g., servers) and software resources of the cloud 1214. For example, the resources 1218 include applications and/or data that are utilized while computer processing is executed on servers that are remote from the computing device 1202. In some examples, the resources 1218 also include services provided over the Internet and/or through a subscriber network, such as a cellular or Wi-Fi network.

The platform 1216 abstracts the resources 1218 and functions to connect the computing device 1202 with other computing devices. In some examples, the platform 1216 also serves to abstract scaling of resources to provide a corresponding level of scale to encountered demand for the resources that are implemented via the platform. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

Conclusion

Although implementations of systems for determining viewpoints of three-dimensional objects have been described in language specific to structural features and/or methods, it is to be understood that the appended claims are not necessarily limited to the specific features or methods described. Rather, the specific features and methods are disclosed as example implementations of systems for determining viewpoints of three-dimensional objects, and other equivalent features and methods are intended to be within the scope of the appended claims. Further, various different examples are described, and it is to be appreciated that each described example is implementable independently or in connection with one or more other described examples.

What is claimed is:

1. A method comprising:
   providing a three-dimensional object, the three-dimensional object defining an outer surface;
   disposing a set of candidate viewpoints about the three-dimensional object, the candidate viewpoints viewing overlapping surface data of the outer surface of the three-dimensional object;
   determining, by a viewpoint determination module, a subset of activated viewpoints and a subset of inactivated viewpoints from the set of candidate viewpoints by iteratively evaluating the set of candidate viewpoints to determine whether to activate or inactivate a respective said candidate viewpoint based on whether the respective said candidate viewpoint provides a threshold amount of additional surface data relative to activated viewpoints in the subset of activated viewpoints, and such that the subset of activated viewpoints views less of the overlapping surface data relative to the set of candidate viewpoints; and
   performing one or more digital operations on the three-dimensional object using the subset of activated viewpoints without using the subset of inactivated viewpoints.

2. The method as described in claim 1, wherein the one or more digital operations includes texturing of the outer surface of the three-dimensional object.

3. The method as described in claim 1, wherein the set of candidate viewpoints are arranged in a framework about the three-dimensional object and wherein the framework is a sphere and wherein each candidate viewpoint of the set of candidate viewpoints is directed at the three-dimensional object in a direction that is normal to the framework.

4. The method as described in claim 1, wherein iteratively activating or inactivating the candidate viewpoints is accomplished iteratively for successive adjacent candidate viewpoints.

5. The method as described in claim 1, wherein determining the subset of activated viewpoints includes activating one or more of the inactivated viewpoints to the subset of activated viewpoints if the one or more of the inactivated viewpoints provides a threshold amount of additional surface data relative to the subset of activated viewpoints.

6. The method as described in claim 1 wherein the subset of activated viewpoints includes at least 2% but no greater than 70% of the candidate viewpoints after determining of the subset of activated viewpoints and wherein the set of candidate viewpoints includes at least 100 candidate viewpoints.

7. The method as described in claim 1, wherein the amount of additional surface data provided by the candidate viewpoints is based on a determination of how close to normal views provided by the candidate viewpoints are to sections of the outer surface of the three-dimensional object.

8. The method as described in claim 1, wherein iteratively evaluating the candidate viewpoints includes selecting successive adjacent candidate viewpoints according to a helical or spiral pattern.

9. The method as described in claim 1, wherein determining whether each candidate viewpoint provides a threshold amount of additional surface data includes dividing portions of the outer surface viewed by each candidate viewpoint into sections, each section corresponding to a section of surface viewed by a pixel of the candidate viewpoint, and the portions displayed on a UV map.

10. The method as described in claim 1, wherein determining the subset of activated viewpoints includes maintaining an overall confidence value for the subset of activated viewpoints, the overall confidence value being updated when a candidate viewpoint is activated and added to the subset of activated viewpoints.

11. A system, comprising:

a non-transitory computer readable medium;

a processing system in communication with the computer readable medium;

a viewpoint module implemented by the processing system to establish a set of candidate viewpoints about a three-dimensional object, the three-dimensional object defining an outer surface, the candidate viewpoints viewing overlapping surface data of the outer surface of the three-dimensional object;

a viewpoint determination module implemented by the processing system to determine a subset of activated viewpoints and a subset of inactivated viewpoints from the set of candidate viewpoints by iteratively evaluating the set of candidate viewpoints to determine whether to activate or inactivate a respective said candidate viewpoint based on whether the respective said candidate viewpoint provides a threshold amount of additional surface data relative to activated viewpoints in the subset of activated viewpoints, and such that the subset of activated viewpoints views less of the overlapping surface data relative to the set of candidate viewpoints; and a digital operations module implemented by the processing system to perform performing one or more digital operations on the three-dimensional object using the subset of activated viewpoints without using the subset of inactivated viewpoints.

12. The system as described in claim 11, wherein the one or more digital operations includes texturing of the outer surface of the three-dimensional object.

13. The system as described in claim 11, wherein the set of candidate viewpoints are arranged in a framework about the three-dimensional object and wherein the framework is a sphere and wherein each candidate viewpoint of the set of candidate viewpoints is directed at the three-dimensional object in a direction that is normal to the framework.

14. The system as described in claim 11, wherein iteratively activating or inactivating the candidate viewpoints is accomplished iteratively for successive adjacent candidate viewpoints.

15. The system as described in claim 11, wherein the viewpoint determination module determines the subset of activated viewpoints by activating one or more of the inactivated viewpoints to the subset of activated viewpoints if the one or more of the inactivated viewpoints provides a threshold amount of additional surface data relative to the subset of activated viewpoints.

16. The system as described in claim 11 wherein the subset of activated viewpoints includes at least 2% but no greater than 70% of the candidate viewpoints after determining of the subset of activated viewpoints and wherein the set of candidate viewpoints includes at least 100 candidate viewpoints.

17. The system as described in claim 11, wherein the amount of additional surface data provided by the candidate viewpoints is based on a determination of how close to normal views provided by the candidate viewpoints are to sections of the outer surface of the three-dimensional object.

18. A non-transitory computer-readable storage medium storing executable instructions, which when executed by a processing device, cause the processing device to perform operations comprising:

providing a three-dimensional object, the three-dimensional object defining an outer surface;

disposing a set of candidate viewpoints about the three-dimensional object, the candidate viewpoints viewing overlapping surface data of the outer surface of the three-dimensional object;

determining a subset of activated viewpoints and a subset of inactivated viewpoints from the set of candidate viewpoints by iteratively evaluating the set of candidate viewpoints to determine whether to activate or inactivate a respective said candidate viewpoint based on whether the respective said candidate viewpoint provides a threshold amount of additional surface data relative to activated viewpoints in the subset of activated viewpoints, and such that the subset of activated viewpoints views less of the overlapping surface data relative to the set of candidate viewpoints; and performing one or more digital operations on the three-dimensional object using the subset of activated viewpoints without using the subset of inactivated viewpoints.

19. The computer-readable storage medium as described in claim 18, wherein the one or more digital operations includes texturing of the outer surface of the three-dimensional object and wherein the set of candidate viewpoints includes at least 100 candidate viewpoints.

20. The computer-readable storage medium as described in claim 18, wherein the amount of additional surface data provided by the candidate viewpoints is based on a determination of how close to normal views provided by the candidate viewpoints are to sections of the outer surface of the three-dimensional object.

* * * * *